United States Patent
Deutsch et al.

(10) Patent No.: US 9,338,656 B2
(45) Date of Patent: May 10, 2016

(54) CONDITIONAL LIMITED SERVICE GRANT BASED ON DEVICE VERIFICATION

(75) Inventors: Steven W. Deutsch, Folsom, CA (US); Abhilasha Bhargav-Spantzel, Santa Clara, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 13/997,759

(22) PCT Filed: Mar. 28, 2012

(86) PCT No.: PCT/US2012/030809
§ 371 (c)(1),
(2), (4) Date: Jun. 25, 2013

(87) PCT Pub. No.: WO2013/147757
PCT Pub. Date: Oct. 3, 2013

(65) Prior Publication Data
US 2013/0337777 A1    Dec. 19, 2013

(51) Int. Cl.
| | | |
|---|---|---|
| *H04W 12/08* | (2009.01) | |
| *H04W 12/06* | (2009.01) | |
| *H04L 9/32* | (2006.01) | |
| *H04L 29/06* | (2006.01) | |
| *H04W 4/00* | (2009.01) | |

(52) U.S. Cl.
CPC ............ *H04W 12/08* (2013.01); *H04L 9/3228* (2013.01); *H04L 63/0838* (2013.01); *H04W 12/06* (2013.01); *H04W 4/001* (2013.01)

(58) Field of Classification Search
CPC .................................................... H04W 12/08
USPC .............................................. 455/411, 404.1
See application file for complete search history.

(56) References Cited

U.S. PATENT DOCUMENTS

| | | | |
|---|---|---|---|
| 8,127,292 B1* | 2/2012 | Dobrovolskiy et al. | .......... 718/1 |
| 2005/0278775 A1 | 12/2005 | Ross | |
| 2006/0236408 A1* | 10/2006 | Yan | ................. 726/29 |
| 2007/0130472 A1 | 6/2007 | Buer et al. | |
| 2008/0046581 A1 | 2/2008 | Molina et al. | |
| 2008/0244292 A1* | 10/2008 | Kumar et al. | ................. 713/323 |

(Continued)

FOREIGN PATENT DOCUMENTS

| | | |
|---|---|---|
| EP | 0917119 A2 | 5/1999 |
| KR | 101088029 B1 | 11/2011 |

OTHER PUBLICATIONS

International Preliminary Report on Patentability mailed Oct. 9, 2014 for International Application No. PCT/US2012/030809, 4 pages.

(Continued)

*Primary Examiner* — Jinsong Hu
*Assistant Examiner* — Jean Chang
(74) *Attorney, Agent, or Firm* — Schwabe, Williamson & Wyatt, P.C.

(57) ABSTRACT

Embodiments of apparatus, computer-implemented methods, systems, devices, and computer-readable media are described herein for accepting capability attestation of a device for determination of whether to grant access to a service during a state of operation. In various embodiments, access to the service sought may be conditionally granted responsive to verification of the capability attested. In various embodiments, during the state of operation, access to the service may be granted on a limited basis.

17 Claims, 4 Drawing Sheets

(56) References Cited

U.S. PATENT DOCUMENTS

| | | | |
|---|---|---|---|
| 2008/0254850 A1* | 10/2008 | Sylla | 463/16 |
| 2009/0143046 A1* | 6/2009 | Smith | 455/404.1 |
| 2010/0125731 A1* | 5/2010 | Dasari et al. | 713/155 |
| 2010/0235648 A1* | 9/2010 | Hoang et al. | 713/189 |
| 2010/0303064 A1 | 12/2010 | Bari | |
| 2011/0010543 A1* | 1/2011 | Schmidt | H04W 12/10 713/168 |
| 2011/0078773 A1* | 3/2011 | Bhasin et al. | 726/5 |
| 2011/0078799 A1* | 3/2011 | Sahita et al. | 726/26 |
| 2011/0191859 A1* | 8/2011 | Naslund | G06F 21/10 726/27 |
| 2012/0239567 A1 | 9/2012 | Choi | |
| 2013/0067245 A1* | 3/2013 | Horovitz et al. | 713/193 |

OTHER PUBLICATIONS

International Search Report and Written Opinion mailed Nov. 30, 2012 for International Application No. PCT/US2012/030809, 10 pages.

Extended European Search Report mailed Nov. 12, 2015 for European Application No. 12872706.2, 10 pages.

Jeffrey S. Dwoskin et al., "Hardware-rooted trust for secure key management and transient trust", Proceedings of the 14TH ACM Conference on Compute and Communications Security, CCS '07, Oct. 31, 2007, New York, NY, 12 pages.

* cited by examiner

US 9,338,656 B2

CONDITIONAL LIMITED SERVICE GRANT BASED ON DEVICE VERIFICATION

CROSS REFERENCE TO RELATED APPLICATIONS

The present application is a national phase entry under 35 U.S.C. §371 of International Application No. PCT/US2012/030809, filed Mar. 28, 2012, entitled "CONDITIONAL LIMITED SERVICE GRANT BASED ON DEVICE VERIFICATION", which designated, among the various States, the United States of America. The Specification of the PCT/US2012/030809 Application is hereby incorporated by reference.

FIELD

Embodiments of the present invention relate generally to the technical field of data processing, and more particularly, to conditional limited service grant based on device verification, e.g. before, during and/or after planned or unplanned events.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

In times of crisis, such as after a natural disaster, or before, during or after other planned or unplanned events, demand for services such as access to communication networks may outpace availability of those services. For example, emergency personnel such as first responders (e.g., firefighters, police officers, paramedics) may have difficulty accessing a cellular telephone network during a crisis due to a high volume of utilization of the cellular telephone network by regular users.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit ("ASIC"), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
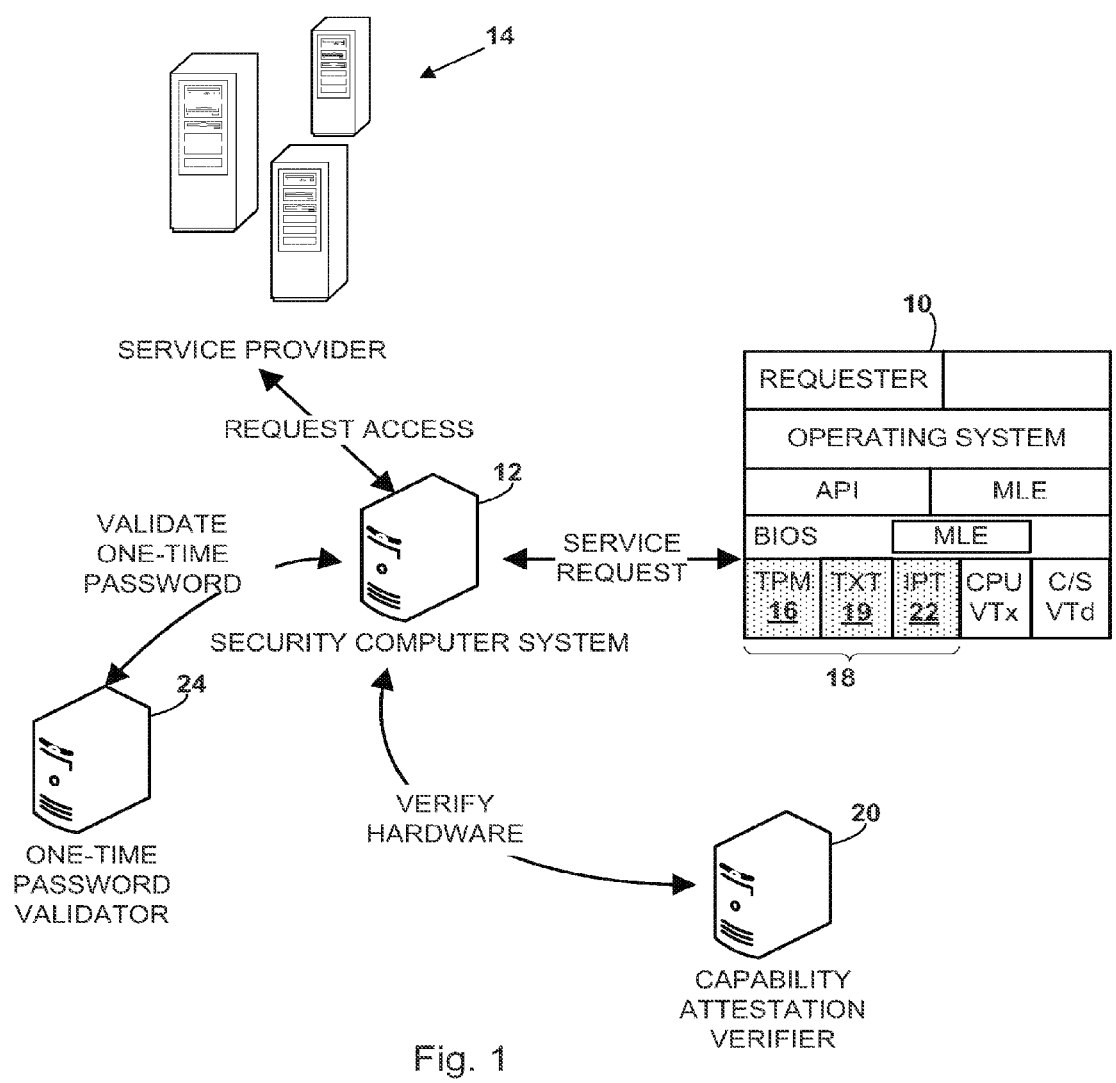
FIG. 1 schematically illustrates an example of how first responder devices may provide various types of information to gain access to a service during a state of operation, in accordance with various embodiments.

Referring now to FIG. 1, in various embodiments, a device 10 (configured with applicable portions of the teachings of the present disclosure) may seek access to a service during a state of operation, such as a crisis, in which service is to be granted on a limited basis. In various embodiments, the service may be prioritized access to a communication network such as a cellular network, and access thereto may be granted on a conditional and/or limited basis during one or more states of operation (e.g., crisis). In various embodiments, "prioritized access" may include a higher level of quality of service ("QoS") than is provided to other devices.

In various embodiments, the "state of operation" may exist before, during and/or after occurrence of an event, such as an emergency (e.g., natural disaster, fire, riots, terrorist attack, etc.), at a particular location or within a particular region. In various embodiments, the event may be planned (e.g., sporting event, political rally, demonstration, etc.) or unplanned (e.g., natural disaster, terrorist attack, power blackout, etc.). In various embodiments, device 10 may be a mobile phone (e.g., a smart phone) or other computing device of a first responder associated with the location or region, such as a police officer, firefighter or paramedic. For example, a region may be policed by officers of a particular precinct, and device 10 may be a type of communication device such as a mobile phone issued to those police officers.

Device 10 may be remotely disposed from a provider of the service sought. For example, in FIG. 1, device 10 is remotely disposed from a security computing device 12. In various embodiments, security computing device 12 may be an appliance or other computing device, such as an Evolved Node B ("eNB") as described in 3GPP Long Term Evolution ("LTE") Release 10 (March 2011) (the "LTE Standard"), that is configured with applicable portions of the teachings of the present disclosure to act as a gatekeeper to a provider 14 of a service. In various embodiments, security computing device 12 may implement any of a number of other wireless standards or protocols, including but not limited to Wi-Fi (IEEE 802.11 family), WiMAX (IEEE 802.16 family), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond.

In various embodiments, provider 14 may include one or more computing devices (which may or may not be configured with applicable portions of the teachings of the present disclosure) of a telecommunications company, such as a cellular network provider. To perform the role of gatekeeper, in various embodiments, security computing device 12 may accept various types of information from device 10, and conditionally grant access to the service sought by device 10 after performing various checks using the information. In various embodiments, instead of a separate gatekeeper security computing device 12, provider 14 may itself act as gatekeeper during a state of operation, such as during a time of crisis.

In various embodiments, the information provided by device 10 to security computing device 12 may include a capability attestation of device 10. In various embodiments, the capability attestation may include hardware capability attestation, and may be made from a trusted partition 18 of device 10. In various embodiments, trusted partition 18 may include one or more components (e.g., memory, processors, executing applications, etc.), access to which may be limited or restricted to various other components. For example, trusted partition 18 may be inaccessible by one or more of an operating system, device drivers and/or one or more applications. Though not required, in various embodiments, such as the embodiment shown in FIG. 1, trusted partition 18 may include a trusted platform module ("TPM") 16. Though also not required, in various embodiments, such as the embodiment shown in FIG. 1, trusted partition 18 of device 10 may include a Trusted Execution Technology ("TXT") hardware component 19 developed by Intel® Corporation of Santa Clara, Calif.

In various embodiments, security computing device 12 may be configured to conditionally grant the service sought by device 10 responsive to verification of the capability attested by device 10 in the required manner. In various embodiments, security computing device 12 may facilitate capability attestation through a third party. For example, in FIG. 1, security computing device 12 may forward hardware capabilities attested by device 10 to a capability attestation verifying computing device 20 (which may or may not be configured with applicable portions of the teachings of the present disclosure), which may verify the attested hardware capabilities.

In various embodiments, security computing device 12 may conditionally grant the service sought by device 10 based on whether verification of a capability attestation made by device 10, e.g., by capability attestation verification computing device 20, indicates that device 10 is a first responder device. For example, where a state of operation exists (e.g., as may be indicated by a state value on security computing device 12 and/or one or more computing devices associated with provider 14), during which, services are granted on a conditional or limited basis, security computing device 12 may grant device 10 access to a service (e.g., prioritized access to a cellular network) if the capabilities attested by device 10 indicate that it is a first responder device, such as a type or class of mobile phone issued to firefighters.

In various embodiments, a device such as device 10 may be conditionally granted access to a service based on other information, in addition to or instead of hardware capabilities of device 10. For example, security computing device 12 may conditionally grant the service sought by device 10 based on an identity of a user (not shown) of device 10. Security computing device 12 may accept a credential of the user of device 10, and may conditionally grant the service sought based on whether authentication of the credential indicates that the user is a first responder such as a police officer or firefighter.

In various embodiments, authentication may not only include determining whether the user is a first responder, but also whether the first responder's credentials are still valid or have been revoked. The credential may be various types of information that is associated with a user, such as a personal identification number ("PIN") selected by or assigned to the user, or other types of user-specific information, including biometric data (such as retinal or fingerprint data). For example, the user may be prompted by device 10 to provide the credential, e.g., by typing in a PIN or pressing a finger against a fingerprint reader.

In various embodiments, a device such as device 10 may be conditionally granted access to a service, e.g., by security computing device 12, responsive validation of a one-time password accepted by security computing device 12 from device 10. In various embodiments, the one-time password may be generated in trusted partition 18 of device 10 (similar to an attested hardware capability). For example, device 10 may be configured with a one-time password generator 22, which in FIG. 1 includes Identity Protection Technology ("IPT"), developed by Intel® Corporation of Santa Clara, Calif., to generate and/or provide the one-time password. Although shown within trusted partition in FIG. 18, in various embodiments, one-time password generator 22 may be in a different protected partition of device 10, or outside of any protected partition of device 10. In various embodiments, security computing device 12 may facilitate validation of the one-time password by a third party, such as a one-time password validating computing device 24 (which may or may not be configured with applicable portions of the teachings of the present disclosure) in FIG. 1.

In various embodiments, after a user receives a device such as device 10, the user may enroll device 10 with one-time password validating computing device 24. In various embodiments, the user may also obtain an appropriate user credential, e.g., with one-time password validating computing device 24 and/or security computer system 12. For instance, a user may log into a website associated with one-time password validating computing device 24 and request that one-time password functionality be configured on the user's device 10. At the same time, in various embodiments, the user may also associate a credential such as a PIN and/or a username with the one-time password.

In various embodiments, a device such as device 10 may be conditionally granted access to a service, e.g., by security computing device 12, based on a unique identifier provided by device 10. For example, in various embodiments, a Platform Embedded Asymmetrical Token, or "PEAT," may be stored in trusted partition 18 of device 10, and may be used, in addition to or instead of various other types of information, to conditionally grant device 10 access to a service.

In various embodiments, security computing device 12 may conditionally grant access to device 10 based on various combinations of types of information. For example, security computing device 12 may conditionally grant access to a service solely responsive to verification of a capability attested by device 10. In various embodiments, security computing device 12 may conditionally grant access to a service responsive to verification of a capability attested by device 10, and responsive to authentication of a credential associated with a user of device 10. In various embodiments, security computing device 12 may conditionally grant access to a service based on verification of a capability attested by device 10, responsive to authentication of a credential associated with a user of device and responsive to validation of a one-time password associated with device 10. In various embodiments, security computing device 12 may conditionally grant access to a service responsive to authentication of a credential associated with a user of device and responsive validation of a one-time password associated with device 10. In various embodiments, access to a service may be conditionally granted responsive to verification of a capability attested by device 10 and validation of a one-time password associated with device 10. Any other combination of types of information may be checked before conditionally granting access to the service.

Figure 2:
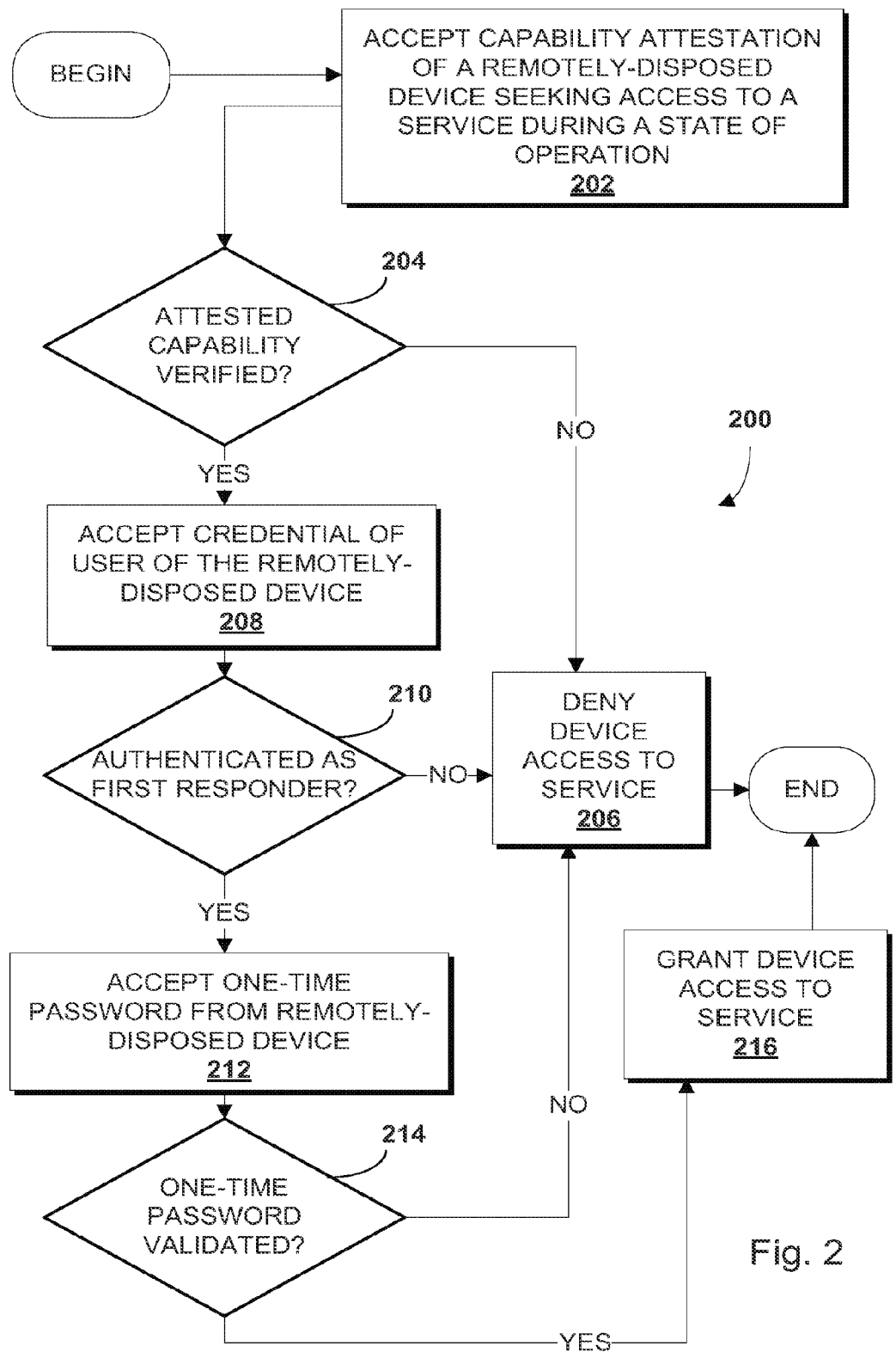
FIG. 2 schematically depicts an example method that may be implemented by a computing device associated with a provider of a service, in accordance with various embodiments.

An example method 200 that may be implemented by a device such as security device 12 is shown in FIG. 2. At block 202, a capability attestation of a remotely-disposed device seeking access to a service, e.g., device 10, may be accepted, e.g., by security computing device 12, during a particular state of operation, e.g., during a crisis. At block 204, the capability attested may be verified, e.g., by security computing device 12 through a third party such as capability attestation verification computing device 20 (e.g., which may be configured with TXT or similar technology). If the attested capability cannot be verified (e.g., device 10 is not registered as a first responder device), then method 200 may proceed to block 206. The remotely-disposed device may be denied access, e.g., by security computing device 12, to the service sought, and method 200 may end.

If the attested capability is verified, however, then at block 208, a credential of a user of the remotely-disposed device may be accepted, e.g., by security computing device 12. For example, the user may provide a PIN, retinal data, fingerprint data or the like that may be used to authenticate the user, e.g., as a first responder. At block 210, the credential may be authenticated, e.g., by security computing device 12 itself or via a third party (not shown). If the credential cannot be authenticated, then the method may proceed to block 206. Access to the service may be denied, e.g., by security computing device 12, to the remotely-disposed device, and method 200 may end.

If the provided credential is authenticated, however, then at block 212, a one-time password may be accepted, e.g., by security computing device 12, from the remotely-disposed device. At block 214, the one-time password may be validated, e.g., by security computing device 12 via a third party such as one-time password validating computing device 24. If the one-time password cannot be validated, then the method 200 may proceed to block 206. Access by the device to the service may be denied, e.g., by security computing device 12, and the method 200 may end. However, if the one-time password is validated, then at block 216, access to the service may be granted, e.g., by security computing device 12, to the remotely-disposed device. After access is granted, the method may end.

In the method 200 of FIG. 2, three pieces of information (capability of remotely-disposed device, credential of user, one-time password) are checked before access to a service is provided. However, as discussed above, this is not limiting. Methods in various embodiments may include checks of any one, two or three of the pieces of information checked by method 200. Additionally, these pieces of information may be checked in different orders than that shown in FIG. 2. Additionally or alternatively, different levels of access to a service, e.g., varying levels of QoS on a cellular network, may be granted based on the number of pieces of information that are successfully checked for a given device.

Figure 3:
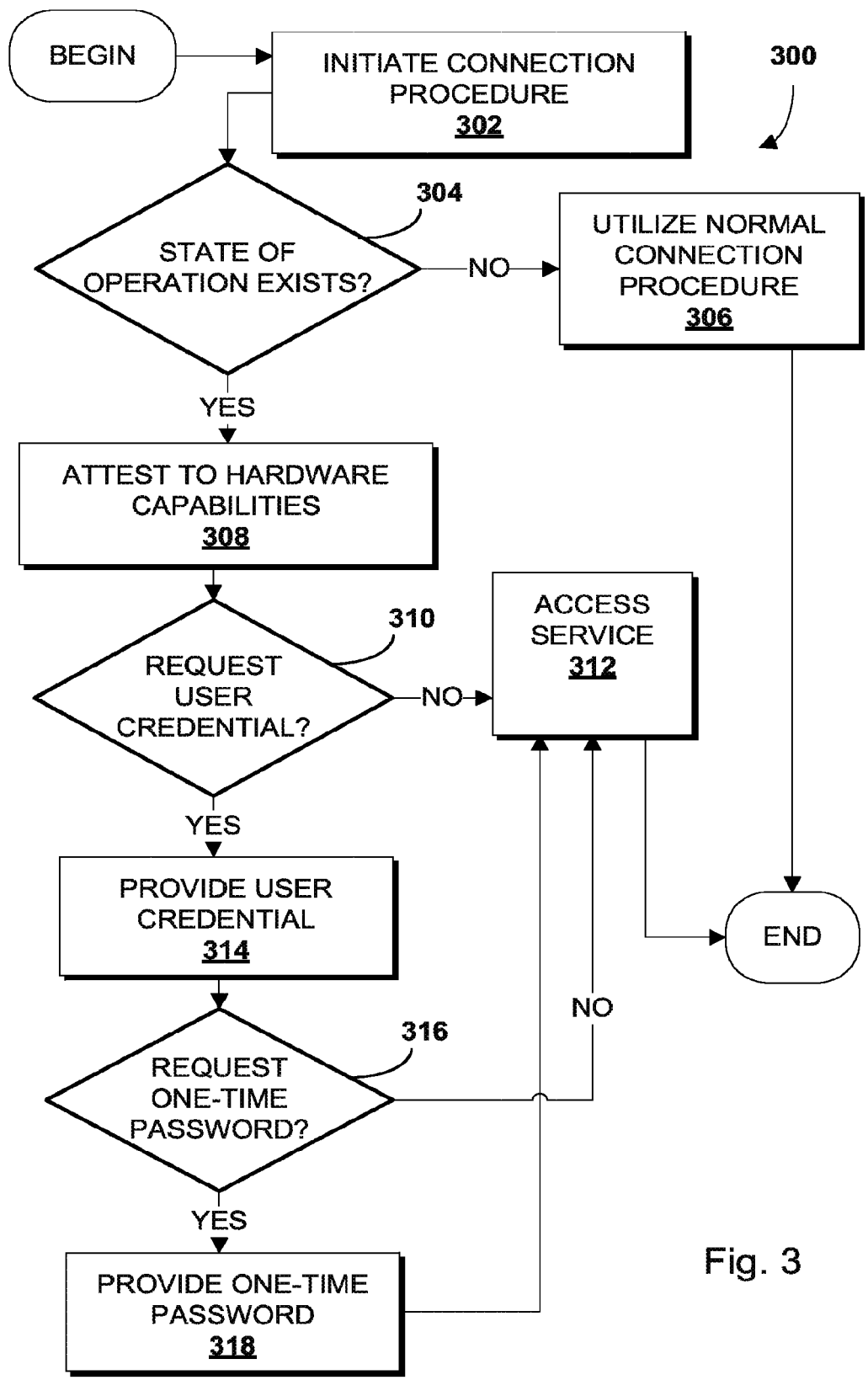
FIG. 3 schematically depicts an example method that may be implemented by a first responder device, in accordance with various embodiments.

FIG. 3 depicts an example method 300 that may be implemented on a device such as device 10 in FIG. 1. At block 302, a connection procedure may be initiated, e.g., by device 10. At block 304, a determination may be made, e.g., by device 10, of whether a particular state of operation, such as a state of crisis, exists. For example, upon initial connection, device 10 may inquire, e.g., with security computing device 12, whether a state of operation exists. If a state of operation does not exist, then at block 306, a normal connection procedure may be utilized, e.g., by device 10. In such case, security computing device 12 may simply pass messages between device 10 and one or more computing devices of provider 14, and/or redirect device 10 to exchange messages directly with one or more computing devices of provider 14. After block 306, method 300 may end.

However, if a particular state of operation (e.g., crisis) exists, then at block 308, device 10 may transmit, e.g., to security computing device 12, a capability (e.g., hardware) attestation of device 10. For example, device 10 may provide a remote attestation of its hardware capabilities from TPM 16, e.g., to security computing device 12. If the attested capabilities are verified, e.g., by security computing device 12 at block 204 of FIG. 2, then at block 310, a request for a user credential may or may not be transmitted, e.g., by security computing device 12 to device 10.

If no request for a user credential is transmitted, then in various embodiments, at block 312, device 10 may access the service it sought. This might occur where security computing device 12 requires attestation of hardware capabilities but nothing more in order to provide access to a service. After block 312, method 300 may end.

However, if a request for a user credential is transmitted, then in various embodiments, at block 314, device 10 may provide, e.g., to security computing device 12, a user credential. For example, a user of device 10 may type in a PIN using a keyboard of device 10. In various embodiments, device 10 may include a retina or fingerprint reading apparatus that may collect retinal or fingerprint data from the user as a credential.

If the user credential is authenticated, e.g., by security computing device 12 at block 210 of FIG. 2, then in various embodiments, at block 316, a request for a one-time password may or may not be transmitted to device 10, e.g., by security computing device 12. If a request for a one-time password is not transmitted, then in various embodiments, the method 300 may proceed to block 312, and device 10 may access the service. This may occur in embodiments where security computing device 12 requires hardware capability attestation and a user credential to gain access to the service, but not a one-time password. In such embodiments, after block 312, method 300 may end. However, if the one-time password is requested, then in various embodiments, at block 318, device 10 may provide, e.g., from a protected IPT module 22, the one-time password. As discussed above, in various embodiments, security computing device 12 may validate the one-time password, e.g., through a third party such as one-time password validating computing device 24 at block 214. Assuming the one-time password is validated, then at block 312, device 10 may be permitted to access the service. After block 312, method 300 may end.

Although embodiments and examples described herein have related primarily to providing first responders with prioritized access to services during states of operation such that may indicate crises, disclosed techniques may be implemented in other scenarios. For example, a service such as access to a corporate intranet may be provided by a corporation. During particular states of operation, e.g., during a merger or at the end of a quarter, devices such as mobile phones, laptop computers or computing tablet issued to high-level executives of the corporation may be granted prioritized access to the corporate intranet.

Various terms have been used in particular contexts for clarity, and may be interchangeable with other terms. For example, "verification" has been used to describe how hardware capabilities of a device are checked. "Authentication" has been used to describe how a user credential is checked. And "validation" has been used to describe how a one-time password is checked. However, these separate terms are not meant to limit how checks on these types of information are performed.

Figure 4:
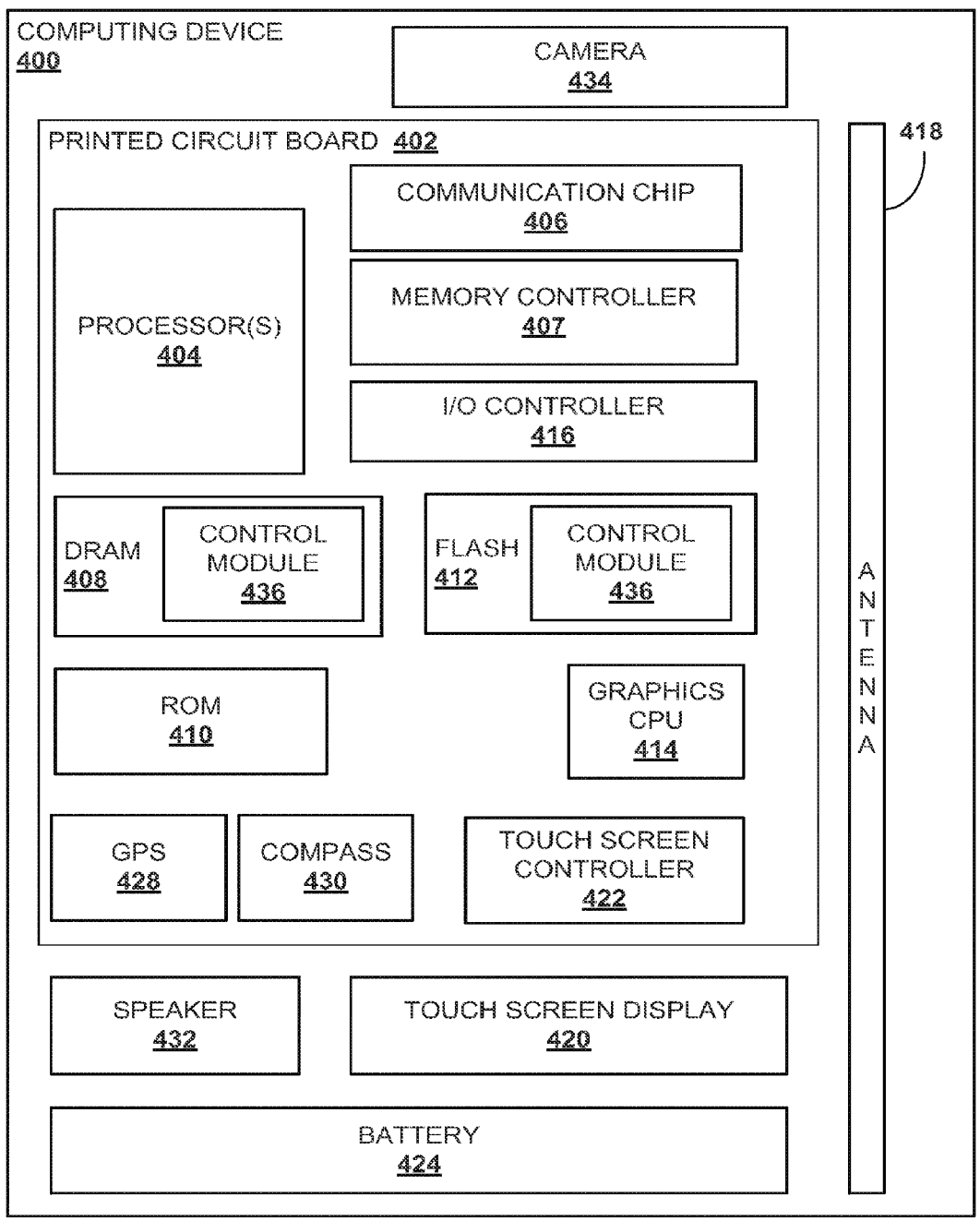
FIG. 4 schematically depicts an example computing device on which disclosed methods and computer-readable media may be implemented, in accordance with various embodiments.

FIG. 4 illustrates an example computing device 400 (which may also be referred to as a system) suitable for use as device 10 or security computer system 12, in accordance with various embodiments. The computing device may include a number of components, including but not limited to a printed circuit board ("PCB") 402, a processor 404 and at least one communication chip 406. In various embodiments, the processor 404 may be a processor core. In various embodiments, the at least one communication chip 406 may also be physically and electrically coupled to the processor 404, e.g., via PCB 402. In further implementations, the communication chip 406 may be part of the processor 404.

Depending on its applications, e.g., as device 10 or security computer system 12, computing device 400 may include other components that may or may not be physically and electrically coupled to the PCB 402. These other components include, but are not limited to, a memory controller 407, volatile memory (e.g., dynamic random access memory 408, also referred to as "DRAM"), non-volatile memory (e.g., read only memory 410, also referred to as "ROM"), flash memory 412, a graphics processor 414, a digital signal processor (not shown), a crypto processor (not shown), an input/output ("I/O") controller 416, an antenna 418, a display (not shown), a touch screen display 420, a touch screen controller 422, a battery 424, an audio codec (not shown), a video codec (not shown), a power amplifier 426, a global positioning system ("GPS") device 428, a compass 430, an accelerometer (not shown), a gyroscope (not shown), a speaker 432, a camera 434, and a mass storage device (such as hard disk drive, a solid state drive, compact disk ("CD"), digital versatile disk ("DVD"))(not shown), and so forth. In various embodiments, the processor 404 may be integrated on the same die with other components, such as the memory controller 407 and/or the I/O controller 416, to form a System on Chip ("SoC").

In various embodiments, volatile memory (e.g., DRAM 408), non-volatile memory (e.g., ROM 410), flash memory 412, and the mass storage device may include programming instructions configured to enable computing device 400, in response to execution by processor(s) 404, to practice all or selected aspects of method 200 and/or 300. For example, one or more of the memory components such as volatile memory (e.g., DRAM 408), non-volatile memory (e.g., ROM 410), flash memory 412, and the mass storage device may include temporal and/or persistent copies of a control module 436 configured to practice disclosed techniques, such as all or selected aspects of method 200 and/or method 300.

The communication chip 406 may enable wired and/or wireless communications for the transfer of data to and from the computing device 400. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 406 may implement any of a number of wireless standards or protocols, including but not limited to Wi-Fi (IEEE 802.11 family), WiMAX (IEEE 802.16 family), IEEE 802.20, Long Term evolution ("LTE"), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing device 400 may include a plurality of communication chips 406. For instance, a first communication chip 406 may be dedicated to shorter range wireless communications such as Wi-Fi and Bluetooth and a second communication chip 406 may be dedicated to longer range wireless communications such as GPS, EDGE, GPRS, CDMA, WiMAX, LTE, Ev-DO, and others.

The processor 404 of the computing device 400 may include an integrated circuit die packaged within the processor 404. In various embodiments, the integrated circuit die of the processor 404 may include one or more devices, such as transistors or metal interconnects, that are formed to facilitate iterative decoding of ECC codewords using one or more techniques described herein. The term "processor" may refer to any device or portion of a device that processes electronic data from registers and/or memory to transform that electronic data into other electronic data that may be stored in registers and/or memory.

The communication chip 406 may also include an integrated circuit die packaged within the communication chip 406. In various embodiments, the integrated circuit die of the communication chip 406 may include one or more devices, such as transistors or metal interconnects, that are formed to facilitate iterative decoding of ECC codewords.

In various implementations, the computing device 400 may be a laptop, a netbook, a notebook, an ultrabook, a smart phone, a computing tablet, a personal digital assistant ("PDA"), an ultra mobile PC, a mobile phone, a desktop computer, a server, a printer, a scanner, a monitor, a set-top box, an entertainment control unit (e.g., a gaming console), a digital camera, a portable music player, or a digital video recorder. In further implementations, the computing device 400 may be any other electronic device that processes data.

Embodiments of apparatus, computer-implemented methods, systems, devices, and computer-readable media are described herein for accepting capability attestation of a device for determination of whether to grant access to a service during a state of operation. In various embodiments, access to the service sought may be conditionally granted responsive to verification of the capability attested. In various embodiments, during the state of operation, access to the service may be granted on a limited basis.

In various embodiments, the capability attestation may include hardware capability attestation. In various embodiments, the verification of the capability attested may include verification of the capability attested with a third party. In various embodiments, the verification of the capability attested may include verification of the capability attested using Trusted Execution Technology.

In various embodiments, the service may include prioritized access to a communication network. In various embodiments, the service sought may be conditionally granted based on whether the capability attestation indicates that the device is a first responder device. In various embodiments, the service sought may be conditionally granted based additionally on an identity of a user of the device. In various embodiments, a credential of the user of the device may be accepted. In various embodiments, the service sought may be conditionally granted based additionally on whether authentication of the credential indicates that the user is a first responder.

In various embodiments, a one-time password from the device may be accepted. In various embodiments, the service sought may be conditionally granted additionally responsive to validation of the one-time password. In various embodiments, the one-time password may be provided by Identity Protection Technology within the trusted partition.

In various embodiments, a control module of a device such as a mobile phone, a tablet computer other device may transmit to a computing system associated with a provider of a service, from a trusted partition, during a state of operation, a capability attestation of the system. In various embodiments, the control module may receive, from the computing system associated with the provider of the service, a conditional grant of access to the service responsive to verification of the capability attested.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. At least one non-transitory computer-readable medium comprising computer-readable code embodied therein, the computer-readable code including instructions configured to enable an apparatus, in response to execution of the instructions by the apparatus, to accept a hardware capability attestation of a device for determination of whether to grant access to a service during a state of operation, responsive to acceptance of the capability attestation and verification of the capability attested, to conditionally grant access to the service sought, wherein during the state of operation, access to the service is to be granted on a limited basis, and wherein the device is remotely disposed from the apparatus; and wherein:

the capability attestation includes information indicating that the device is a first responder system issued to be granted access to the service during the state of operation; and the capability attestation is made from a trusted partition of the device.

2. The at least one computer-readable medium of claim 1, wherein the verification of the capability attested comprises verification of the capability attested with a third party.

3. The at least one computer-readable medium of claim 1, wherein the instructions, in response to execution by the apparatus, further enable the apparatus to conditionally grant the service sought based on whether the capability attestation indicates that the device is a first responder device.

4. The at least one computer-readable medium of claim 1, wherein the instructions, in response to execution by the apparatus, further enable the apparatus to conditionally grant the service sought based additionally on an identity of a user of the device.

5. The at least one computer-readable medium of claim 1, wherein the instructions, in response to execution by the apparatus, further enable the apparatus to accept a one-time password from the device, and to conditionally grant the service additionally responsive to validation of the one-time password.

6. A computer-implemented method, comprising:
 determining, by a computing device, that a state of operation exists, wherein during the state of operation, access to a service is to be granted on a limited basis;
 accepting, by the computing device, a credential associated with a user of a device seeking access to the service, the device being remotely disposed from the computing device;
 accepting, by the computing device, a hardware capability attestation of the device for determination of whether to grant access to the service sought during the state of operation; and
 accepting, by the computing device, a one-time password, wherein the hardware capability attestation includes information indicating that the device is a first responder system issued to be granted access to the service during the state of operation and wherein the capability attestation is made from a trusted partition of the device; and
 conditionally granting, by the computing device, access to the service sought, responsive to authentication of the credential and validation of the one-time password, and responsive to a determination that a state of operation exists, and further responsive to verification of the capability attested.

7. The computer-implemented method of claim 6, further comprising conditionally granting, by the computing device, the service sought based on whether the authentication of the credential indicates that the user is a first responder.

8. A system, comprising:
 one or more processors;
 memory operably coupled to the one or more processors;
 a trusted partition; and
 a control module to be operated by the one or more processors to transmit to a computing system associated with a provider of a service, from the trusted partition, during a state of operation, a hardware capability attestation of the system, and to receive, from the computing system associated with the provider of the service, a conditional grant of access to the service responsive to verification of the capability attested, wherein during the state of operation, service is to be granted on a limited basis, and wherein the hardware capability attestation includes information indicating that the system is a first responder system issued to be granted access to the service during the state of operation.

9. The system of claim 8, wherein the control module is further to transmit, to the computing system associated with the provider, a credential of a user of the system, and to receive, from the computing system associated with the provider, a conditional grant of access to the service additionally responsive to whether authentication of the credential indicates that the user is a first responder.

10. The system of claim 8, wherein the control module is further to transmit, to the computer system associated with the provider, a one-time password from the trusted partition, and to receive, from the computer system associated with the provider, a conditional grant of access by the system to the service additionally responsive to validation of the one-time password.

11. The system of claim 8, further comprising a touch screen display.

12. The system of claim 8, further comprising a global positioning system device operably coupled to the one or more processors.

13. At least one non-transitory computer-readable medium comprising computer-readable code embodied therein, the computer-readable code including instructions configured to enable an apparatus that seeks access to a service during a state of operation, in response to execution of the instructions by the apparatus, to transmit, from a trusted partition of the apparatus to a computer system associated with a provider of the service, a hardware capability attestation of the apparatus, and to receive a conditional grant of the service sought, from the computer system associated with the provider, responsive to verification of the capability attested, wherein during the state of operation, access to the service is to be granted on a limited basis, and wherein the computer system associated with the provider is remotely disposed from the apparatus, and wherein the hardware capability attestation includes information indicating that the apparatus is a first responder system issued to be granted access to the service during the state of operation.

14. The at least one computer-readable medium of claim 13, wherein the capability attestation from a trusted partition of device comprises capability attestation by components of Trusted Execution Technology within the trusted partition.

15. The at least one computer-readable medium of claim 13, wherein the service comprises prioritized access to a communication network.

16. The at least one computer-readable medium of claim 13, wherein the instructions, when executed by the apparatus, further enable the apparatus to transmit, from the trusted partition, a one-time password to the computer system associated with provider, and to receive, from the computer system associated with the provider, a conditional grant of the service additionally responsive to validation of the one-time password.

17. The at least one computer-readable medium of claim 13, wherein the instructions, when executed by the apparatus, further enable the apparatus to transmit to the computer system associated with the provider a credential associated with a user of the apparatus, and to receive, from the computer system associated with the provider, a conditional grant of the service sought additionally responsive to whether authentication of the credential indicates that the user is a first responder.

* * * * *